US007147163B2

(12) United States Patent
Salvato et al.

(10) Patent No.: US 7,147,163 B2
(45) Date of Patent: *Dec. 12, 2006

(54) ADAPTER UNIT HAVING AN ERGONOMIC GRIP FOR A PERSONAL DIGITAL ASSISTANT

(75) Inventors: Dominick H. Salvato, North Salem, NY (US); Michael J. Sasloff, Hastings-on-Hudson, NY (US); Curt D. Croley, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 297 days.

This patent is subject to a terminal disclaimer.

(21) Appl. No.: 10/790,367

(22) Filed: Mar. 1, 2004

(65) Prior Publication Data
US 2004/0166896 A1 Aug. 26, 2004

Related U.S. Application Data

(63) Continuation of application No. 09/912,162, filed on Jul. 24, 2001, now abandoned.

(60) Provisional application No. 60/263,438, filed on Jan. 23, 2001.

(51) Int. Cl.
*G06K 7/10* (2006.01)
(52) U.S. Cl. ............... 235/472.02; 235/472.01; 235/462.45; 235/462.46
(58) Field of Classification Search ........... 235/472.01, 235/472.02, 462.45, 462.46
See application file for complete search history.

(56) References Cited
U.S. PATENT DOCUMENTS

| 4,983,818 | A | 1/1991 | Knowles |
| 5,218,187 | A | 6/1993 | Koenck et al. |
| 5,313,053 | A | 5/1994 | Koenck et al. |
| 5,335,170 | A | 8/1994 | Petteruti et al. |
| 5,349,497 | A | 9/1994 | Hanson et al. |
| D352,279 | S | 11/1994 | Foy et al. |
| 5,368,159 | A | 11/1994 | Doria |
| 5,388,692 | A | 2/1995 | Withrow et al. |
| 5,539,194 | A | 7/1996 | Miller et al. |
| 5,606,594 | A | 2/1997 | Register et al. |
| D379,265 | S | 5/1997 | Walthen et al. |
| 5,627,349 | A * | 5/1997 | Shetye et al. ............ 178/18.01 |
| 5,648,757 | A | 7/1997 | Vernace et al. |
| 5,675,524 | A | 10/1997 | Bernard |
| 5,692,199 | A | 11/1997 | Kikinis et al. |
| 5,822,546 | A | 10/1998 | George |
| 5,859,628 | A | 1/1999 | Ross et al. |
| 5,867,729 | A | 2/1999 | Swonk |
| 5,890,016 | A * | 3/1999 | Tso ............................ 710/64 |

(Continued)

FOREIGN PATENT DOCUMENTS

JP 2004005164 A * 1/2004

OTHER PUBLICATIONS

Saila Ponnapalli, "Modeling and Design of Antennas for RF Wireless Systems," IEEE Transactions on Advanced Packaging, Aug. 1996, pp. 487-502, vol. 19, Issue 3.

(Continued)

*Primary Examiner*—Kimberly D. Nguyen
(74) *Attorney, Agent, or Firm*—Amin, Turocy, & Calvin, LLP

(57) ABSTRACT

The present invention relates generally to an adapter unit for a personal digital assistant. More specifically, this invention relates to an adapter unit that provides additional functionality, and improved ergonomics and increased ruggedness to the personal digital assistant.

19 Claims, 23 Drawing Sheets

U.S. PATENT DOCUMENTS

| | | | |
|---|---|---|---|
| 5,900,875 A | 5/1999 | Haitani et al. | |
| 5,914,481 A | 6/1999 | Danielson et al. | |
| 5,979,770 A | 11/1999 | Schlieffers et al. | |
| 5,996,956 A | 12/1999 | Shawyer | |
| 6,042,478 A | 3/2000 | Ng et al. | |
| D424,035 S | 5/2000 | Steiner et al. | |
| 6,065,880 A * | 5/2000 | Thompson | 385/88 |
| D426,549 S | 6/2000 | Carlson | |
| 6,115,248 A | 9/2000 | Canova et al. | |
| 6,123,265 A | 9/2000 | Schlieffers et al. | |
| 6,195,589 B1 | 2/2001 | Ketcham | |
| 6,244,513 B1 | 6/2001 | Schlieffers et al. | |
| 6,300,946 B1 | 10/2001 | Lincke et al. | |
| 6,330,973 B1 | 12/2001 | Bridgelall et al. | |
| 6,512,467 B1 | 1/2003 | Hanko et al. | |
| 6,535,199 B1 | 3/2003 | Canova, Jr. et al. | |
| 6,600,657 B1 | 7/2003 | Yerazunis et al. | |
| 6,604,684 B1 | 8/2003 | Schmidt et al. | |
| 6,619,546 B1 | 9/2003 | Nguyen et al. | |
| 6,657,654 B1 * | 12/2003 | Narayanaswami | 348/14.04 |
| 6,708,887 B1 * | 3/2004 | Garrett et al. | 235/462.45 |
| 2002/0078248 A1 | 6/2002 | Janik et al. | |
| 2003/0001909 A1 | 1/2003 | Haitani et al. | |
| 2003/0181168 A1 | 9/2003 | Herrod et al. | |

OTHER PUBLICATIONS

Pravin Bhagwat, "BlueSky: A Cordless Networking Solution for Palmtop Computers," ACM Press, Proceedings of the 5th Annual ACM/IEEE International Conference on Mobile Computing and Networking, 1999, pp. 69-76.

Mike Lynch, "The Silver Slider II", Pocket PC Editor, BrightHand Consulting, Inc., Feb. 19, 2001.

* cited by examiner

ADAPTER UNIT HAVING AN ERGONOMIC GRIP FOR A PERSONAL DIGITAL ASSISTANT

CROSS-REFERENCE TO RELATED APPLICATIONS

This application is a Continuation of U.S. patent application Ser. No. 09/912,162 entitled "ADAPTER UNIT HAVING AN ERGONOMIC GRIP FOR A PERSONAL DIGITAL ASSISTANT" and filed Jul. 24, 2001 now abandoned, which claims priority from U.S. Provisional Patent application Ser. No. 60/263,438 filed Jan. 23, 2001, and is related to U.S. patent application Ser. No. 09/912,195 entitled "ADAPTER UNIT FOR PERSONAL DIGITAL ASSISTANT HAVING AUTOMATICALLY CONFIGURABLE APPLICATION BUTTONS", filed Jul. 24, 2001.

TECHNICAL FIELD

This invention is related generally to an adapter unit for a personal digital assistant. More specifically, this invention relates to an adapter unit that provides additional functionality, and improved ergonomics and increased ruggedness to the personal digital assistant.

BACKGROUND OF THE INVENTION

Personal digital assistants ("PDA") or hand-held computers have limited functions. These devices typically include internal memory for storing application programs and a local database. PDAs also include external connector used during synchronization procedure ("hot-sync") with an external database located in a local or remote PC. The PDA is typically inserted into a "hot-sync" cradle, which is tethered to a desktop PC. The PC has a second database, which is similar to the local PDA database. During the "sync" operation both databases get updated with any information that was added to either one or the databases since the last synchronization procedure. While these devices can have various application programs running on them, they still have limited functionality. For example, a typical PDA may not have a detachable scanner or a detachable radio or a combination of both.

The iPAQ PDA manufactured by Compaq Computer Corporation has an expansion connector for interconnecting with different compatible modules, such as a scanning module. The expansion slot does not replace the "sync" connector, but is provided in addition to it. Thus, the iPAQ has to have two separate connectors to accommodate expanded functionality and "sync" operation. Once a scanning module is connected to the iPAQ, the expansion connector is occupied and no other module can be interconnected with the iPAQ. In addition, the combined device is not rugged enough to be used in industrial environment. Other then interconnecting to the PDA via an electrical connector, the module is not well secured to the PDA and upon drop or vibration the two elements may break or come apart, this rendering the system inoperative.

While the modules are able to provide additional functions to the personal digital assistant, such benefits come at a price. One of the advantages to the personal digital assistants is their portability. These units are designed to fit in a user's hand or palm. In many module designs, the depth and/or width of the combination personal digital assistant and module is considerably larger than originally designed by the personal digital assistant manufacturer. The combination of the two devices becomes difficult for a typical user to grasp.

As additional functions are added to the PDA, there is a greater need to change the functionality of the application buttons on the PDA. Presently, in order to change the function of an application button a user must input data on a series of screens on the PDA indicating the function the user would like to assign to the button. This process requires a certain amount of training on the use of the PDA, can be time consuming and is prone to human errors.

The PDA includes volatile memory such as RAM. Information stored in the volatile memory may be lost if the power level of the PDA's battery falls below a certain level.

Therefore, a need exists to provide a rugged detachable adapter having additional functionality for a hand-held computer such as a PDA.

A need exists to provide a rugged detachable adapter having scanning functionality for a hand-held computer, such as a PDA.

A need exists to provide a rugged detachable adapter having wireless communication functionality for a hand-held computer, such as a PDA.

A need exists to provide a detachable adapter having scanning and wireless communication functionality for a hand-held computer, such as a PDA.

A need exists to provide a rugged detachable adapter having scanning functionality and a user accessible PCMCIA slot for a hand-held computer, such as a PDA.

A need exists to provide an adapter having additional electronic functionality for a hand held computer such as a PDA.

A need exists to provide an adapter having additional electronic functionality for a hand held computer such as a PDA, wherein the combination PDA and adapter connects to a communications cradle in order to communicate with a PC.

A need exits to automatically change the functionality of one of the application buttons on the PDA in a manner that is seamless to the user.

A need exists to provide an adapter having additional nonvolatile memory that can store PDA applications and data when power is critically low.

SUMMARY OF THE INVENTION

The present invention provides an adapter unit that can be detachably secured to a hand-held computer, such as a portable digital assistant ("PDA") computer presently available on the market. Examples of such computers are the iPAQ manufactured by Compaq Computer Corporation, the Palm series manufactured by Palm, Inc. and the Visor series manufactured by Handspring Inc. The invention includes an adapter that adds functionality and ruggedness to a commercially designed device for use in a more industrial environment. The adapter has a PDA connector for interconnecting to the PDA's expansion connector. A scanner, battery and radio functions may be integrated in the adapter. Specifically, the adapter may include a card for wireless local area communication such as the Spectrum24® card manufactured by Symbol Technologies Inc., and/or a card for wireless wide area network communication. The adapter may include additional memory for storing data. This memory may include nonvolatile memory such as flash memory for storing drivers that support the functions added by the adapter. For example, the memory may store drivers for a scanner or a wireless local area network. In an alternative embodiment the adapter has a separated expansion connector for accommodating various functional modules. In certain cases, the adapter may also have its own sync connector, allowing it to be directly inserted into the PDA cradle.

In a preferred embodiment the invention includes an adapter unit that connects to PDA via the PDA's expansion connector. The adapter unit enhances mechanical ruggedness of the PDA and protects the PDA during drop and vibration. The adapter easily slides on the PDA and may incorporate a retainer clip to lock the adapter and the PDA together. Electronics in the adapter add bar code scanning, imaging capability, additional power, wireless and other PC card support.

In another preferred embodiment the invention includes an adapter unit having a gripping surface that enhances the ergonomics of the adapter and helps prevent the adapter from slipping out of a user's hand.

In another preferred embodiment of the invention, the function of one or more of the application buttons on the PDA automatically changes upon the attachment of a device to the PDA.

In another preferred embodiment of the invention, when the PDA's battery is critically low, information stored in the PDA's volatile memory is automatically stored in a non-volatile memory. A strap can also be added on the back of the adapter for ergonomic and comfort reasons.

In an alternative embodiment a handle is added to the design, such that a handle supports the adapter, and the PDA/adapter combination is held as a gun-shaped terminal in the hand of a user. Batteries, both rechargeable and disposable, chargers and control systems can be added to the adapter.

DETAILED DESCRIPTION OF THE INVENTION

Figure 1E:
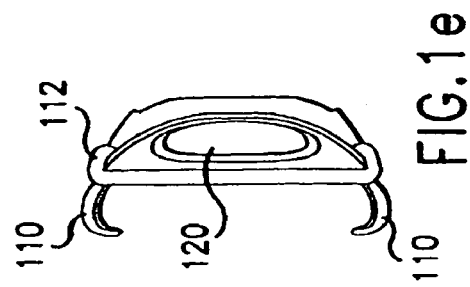
FIG. 1e is a front view of an embodiment of the adapter of the present invention.
Figure 1A:
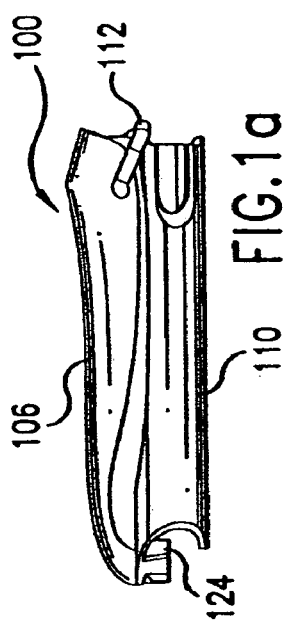
FIG. 1a is a side view of an embodiment of the adapter of the present invention.
Figure 1D:
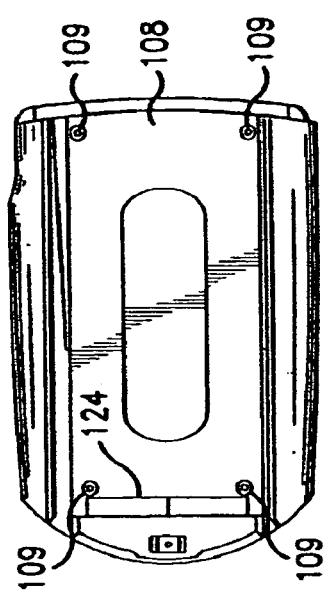
FIG. 1d is a bottom view of an embodiment of the adapter of the present invention.

FIG. 1a represents a side view of a preferred embodiment of the adapter 100 of the present invention. FIG. 1b shows the sled adapter from a top perspective view. FIG. 1g is a bottom perspective view of an embodiment of the adapter of the present invention. As shown in FIGS. 1a and 1b, the sled-type adapter includes a cover 104 and a carrier 106. The carrier 106 includes a bottom wall 108, and two sidewalls 110 extending from bottom wall 108. An interface circuit board and a scanner, a radio, RFID tag reader, global positioning system, telephone, and/or some other module, is housed between the cover 104 and the bottom wall 108 of the adapter. The adapter of FIG. 1a includes an integrated radio with a hidden antenna and an interface board that allows connection to the PDA. FIG. 1e is a front view of the adapter. FIG. 1e shows an adapter having an integrated scanner located behind the scanning window 120. Sidewalls 110 of carrier 106 are curved in such a way that they surround the PDA on both sides and protect the PDA from side-to-side movement and side impact. Sidewalls 110 prevent the adapter from being pulled off the PDA. FIG. 1c is a back view of the adapter of the present invention. It shows the edges of curved sidewalls 110 and the adapter connector 124 extending from the circuit board. A wall portion 107 of the adapter overlaps sidewalls 110, thus creating a seam overlap between the different portions of the adapter. The overlap helps the user to more easily hold the adapter/PDA combination device. FIG. 1d is a view of the adapter from the bottom, exposing the bottom wall 108 of the carrier from underneath. It shows four fasteners 109 that attach carrier 106 to cover 104, enclosing the electronics between carrier 106 and cover 104. Carrier 106 can be attached to the cover 104 and the electronics by snap-in features, screws or glue. It is preferable to make the adapter as thin and as small as possible in order to make it low profile and enhance its ergonomics. When, as in the presently illustrated case, the sidewalls are designed to protect the sides of the PDA, the height of the sidewalls is dictated by the height of the PDA to which the adapter attaches. In other designs the sidewalls may only partially cover the sides of the PDA.

At the extreme case, when no side protection of the PDA is needed, the sidewalls may be replaced by a pair of rails that mate with the corresponding guides on the PDA. However, when the sidewalls are eliminated, the overall ruggedness of the adapter/PDA-combined device is reduced.

Figure 1F:
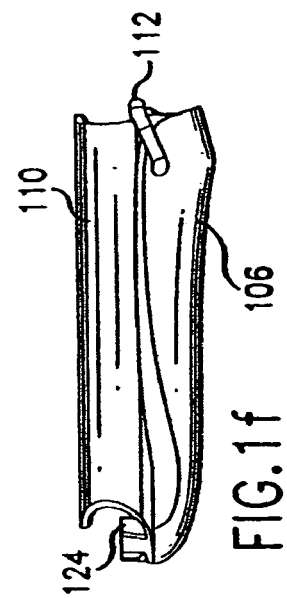
FIG. 1f is another side view of an embodiment of the adapter of the present invention.
Figure 1C:
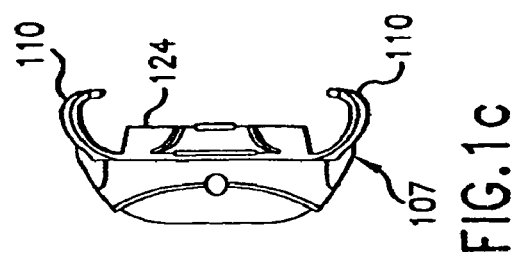
FIG. 1c is a back view of an embodiment of the adapter of the present invention.
Figure 1B:
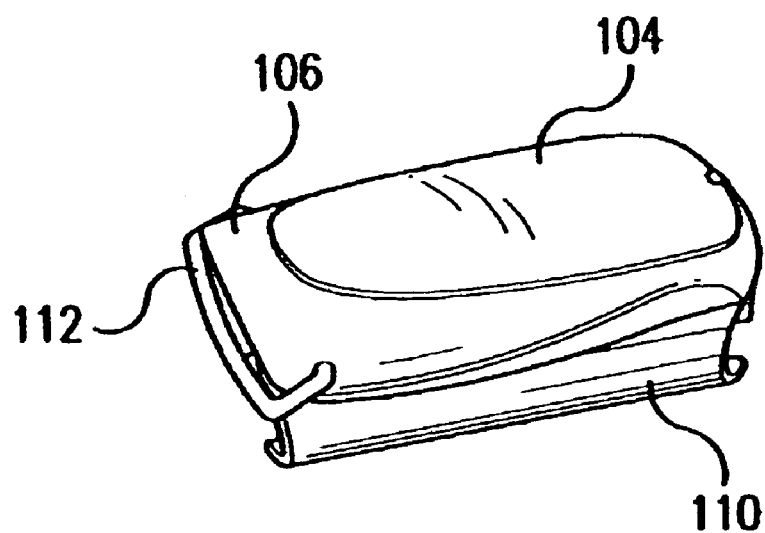
FIG. 1b is a top perspective view of an embodiment of the adapter of the present invention.
Figure 1G:
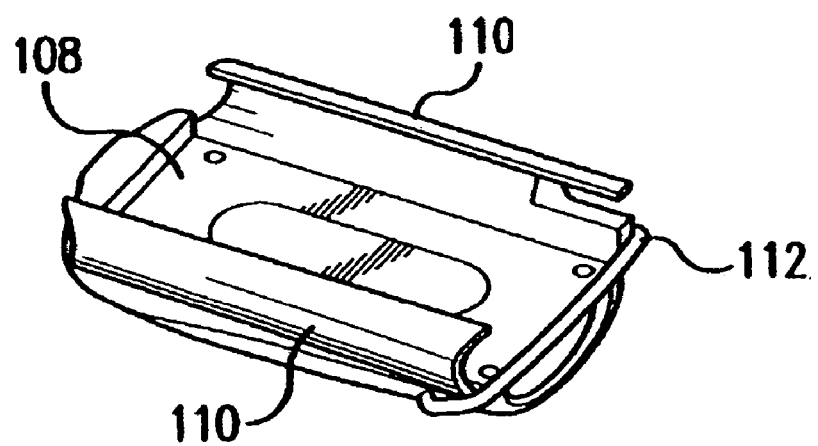
FIG. 1g is a bottom perspective view of an embodiment of the adapter of the present invention.

FIGS. 1f–g are additional views of the adapter when it is placed upside down.

When adapter 100 is connected to the PDA, sidewalls 110 restrict the side-to-side movements of the PDA with respect to adapter 100. Adapter connector 124 restricts movement of the PDA in one direction along the length of adapter 100. In order to restrict the movement of the PDA in the other direction along the length of adapter 100, and to fully secure adapter 100 to the PDA, a retainer clip 112 is provided as part of adapter 100. Retainer clip 112 is shown in FIGS. 1a, 1b, 1f and 1g. Retainer clip 112 secures the PDA to adapter 100 and prevents accidental disconnects between the two devices upon vibration or drop. In alternative embodiments the retainer can be replaced by snap fasteners, interference-fit, or detent features designed into the PDA and the adapter.

Figure 2B:
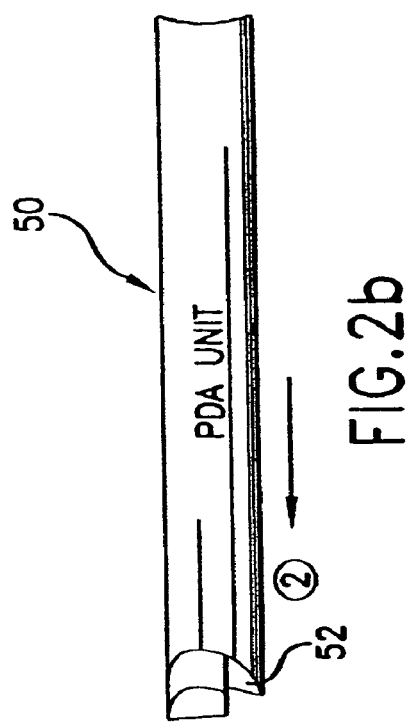
FIG. 2b is a PDA of the present invention.
Figure 2A:
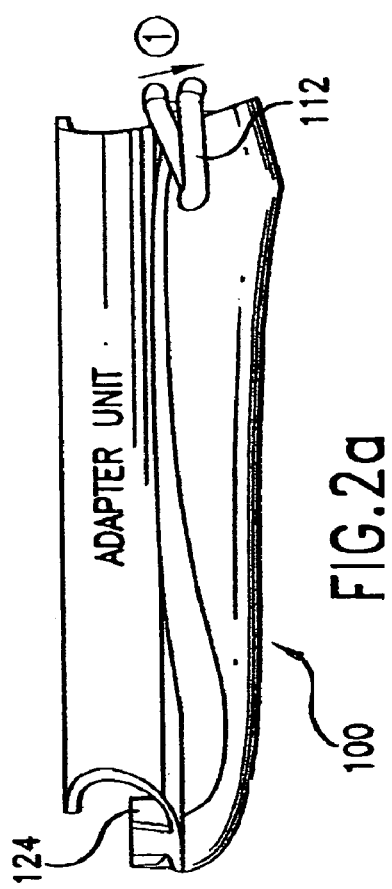
FIG. 2a is a side view of an embodiment of the adapter of the present invention illustrating release of the PDA retaining mechanism.
Figure 2C:
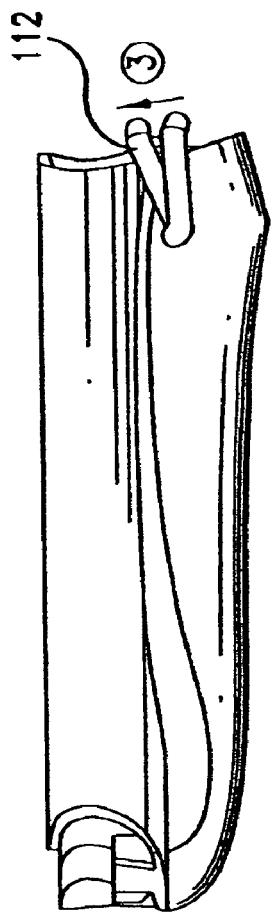
FIG. 2c is an illustration of an embodiment of the adapter of the present invention connected to a PDA.

FIGS. 2a–c illustrate the method of attachment of a PDA 50 to adapter 100 of the present invention. PDA 50 includes an expansion connector 52. First, retainer clip 112 is pushed out of the path of PDA 50 that is being inserted into the adapter. Second, PDA 50 is fully inserted into adapter 100 and the PDA's expansion connector 52 is mated with the corresponding adapter connector 124. Third, retainer clip 112 is pushed back to its original position, fully securing PDA 50 within adapter 100 and preventing accidental separation of adapter 100 from PDA 50. Thus, when PDA 50 is inserted into adapter 100 of the preferred embodiment, adapter 100 protects PDA 50 on five of the PDA's six surfaces. The only PDA surface that remains exposed is the PDA's display surface.

Figure 3:
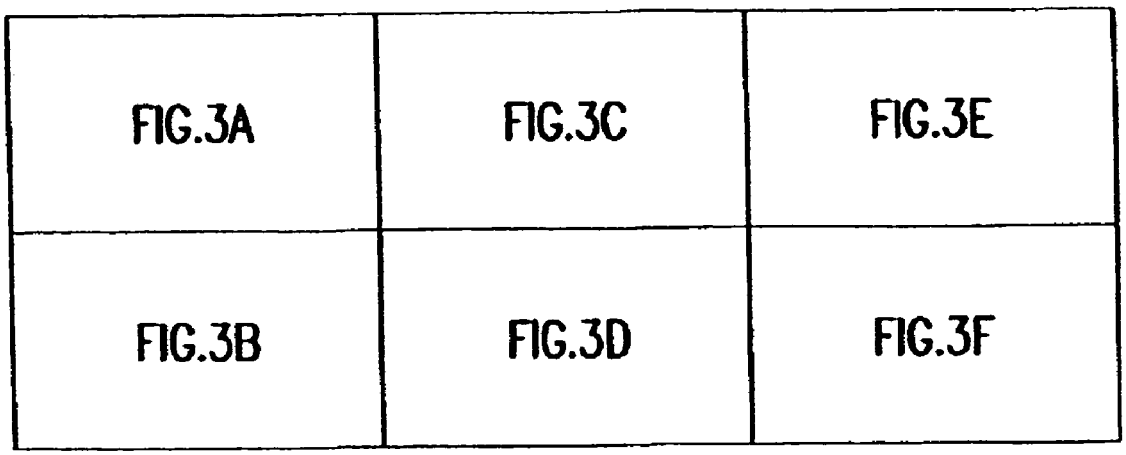
FIG. 3 is a map indicating the relative orientation of the circuits described in FIGS. 3a–3f that comprise an electrical schematic of the adapter of the present invention.
Figure 3A:
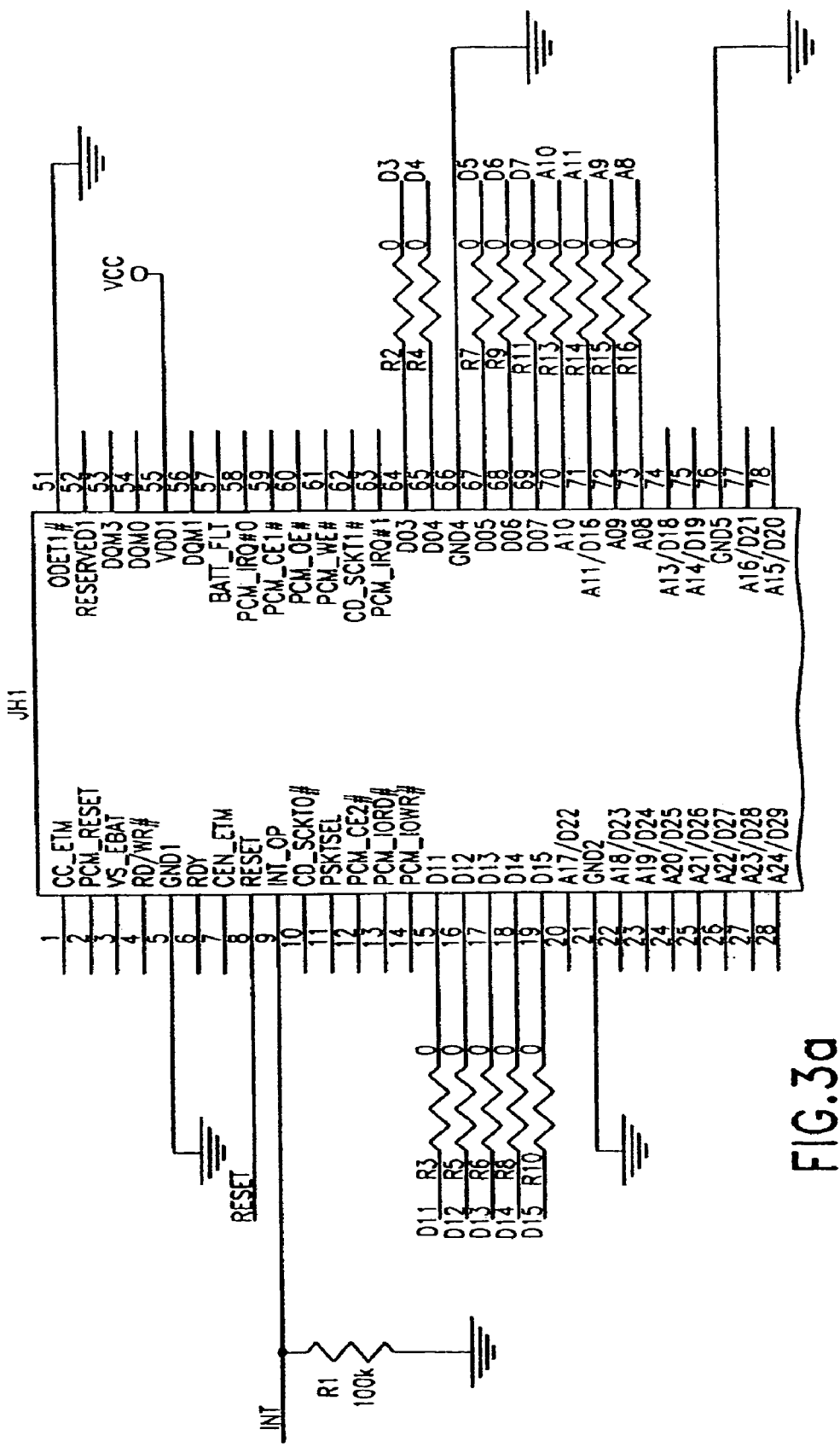
FIG. 3a shows a portion of an interface connector JH1 and pin-outs thereof for the adapter interface board.
Figure 3B:
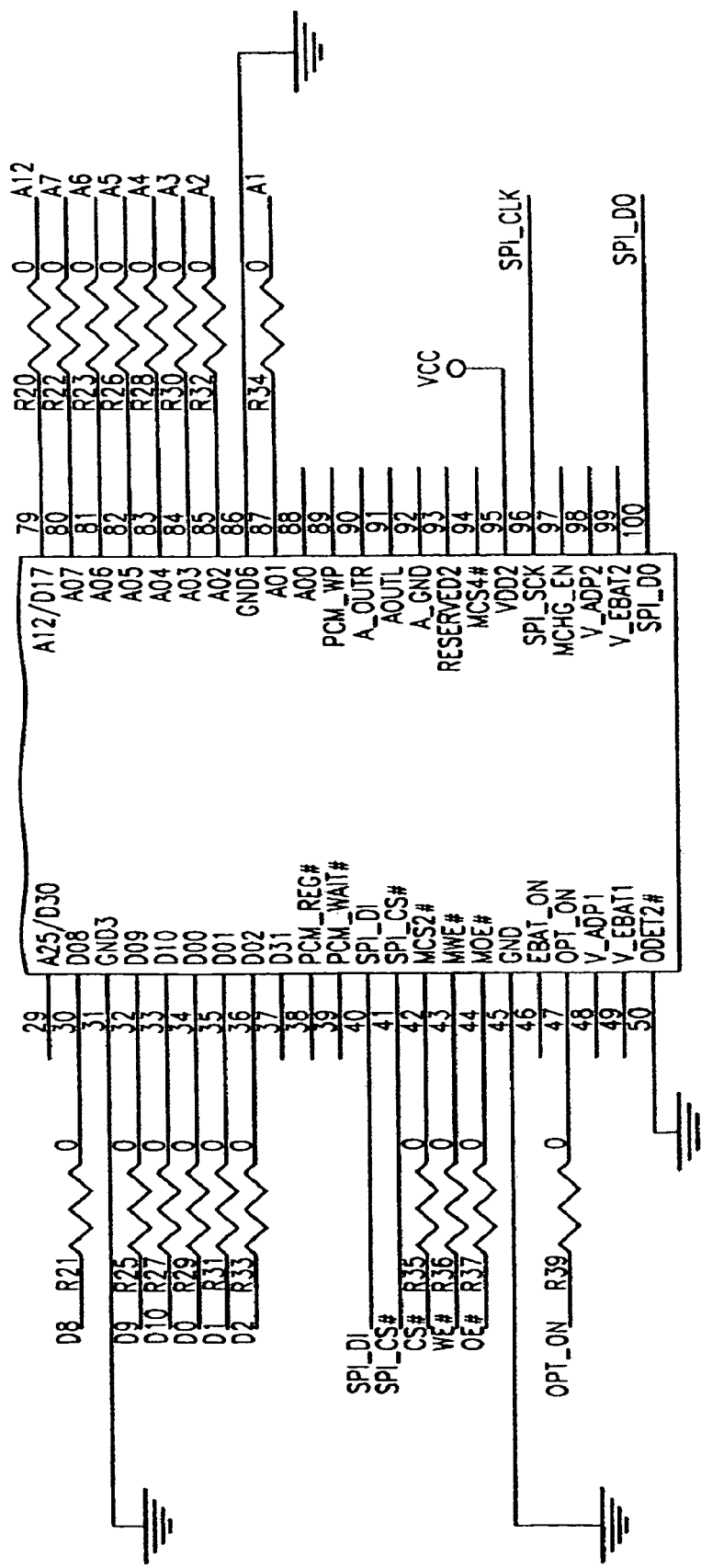
FIG. 3b shows the remaining portion of the interface connector JH1 and pin-outs thereof for the adapter interface board.
Figure 3C:
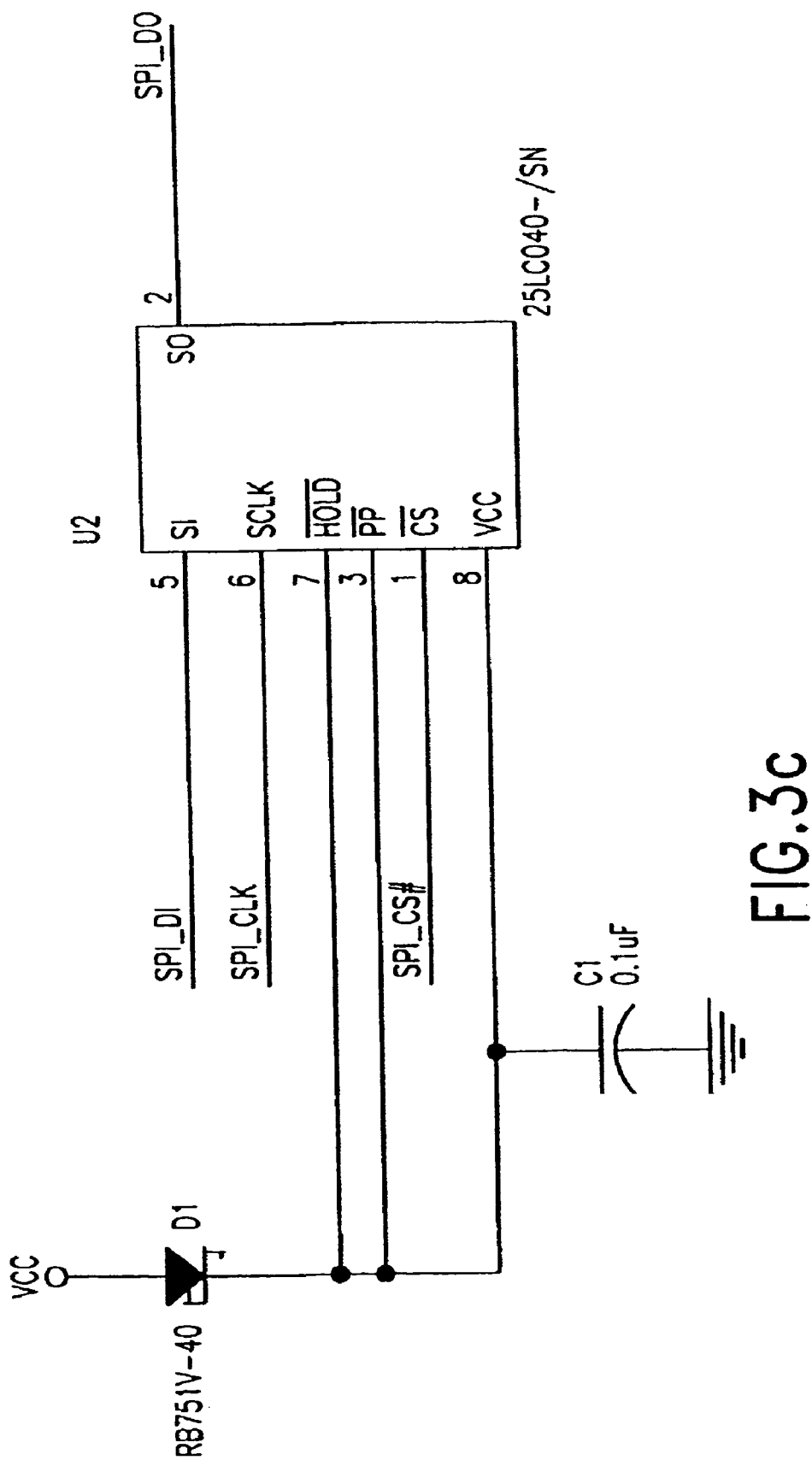
FIG. 3c shows an EEPROM with memory utilized in the adapter interface board.
Figure 3D:
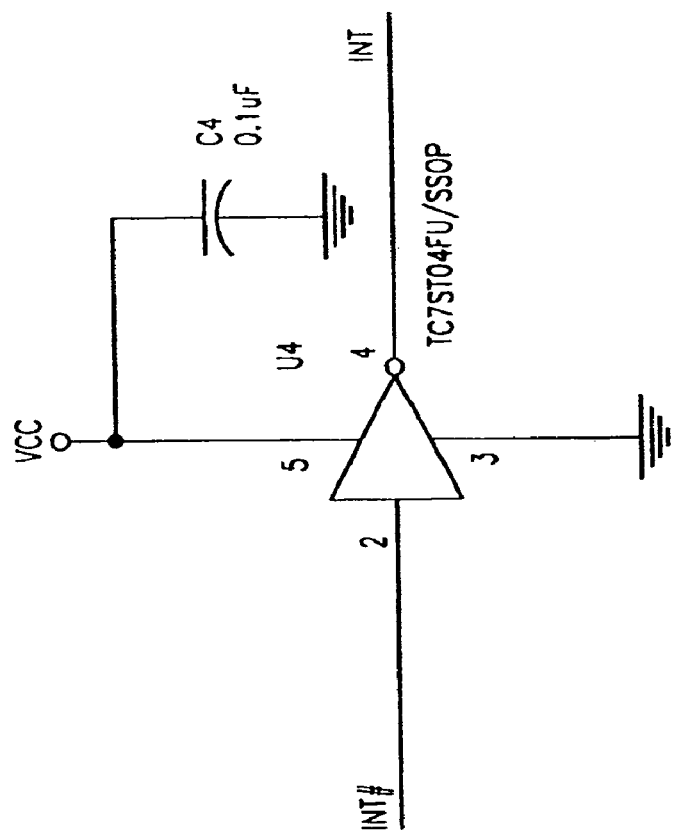
FIG. 3d shows inverter circuits used for the INT and RESET lines of the adapter interface board.
Figure 3D:
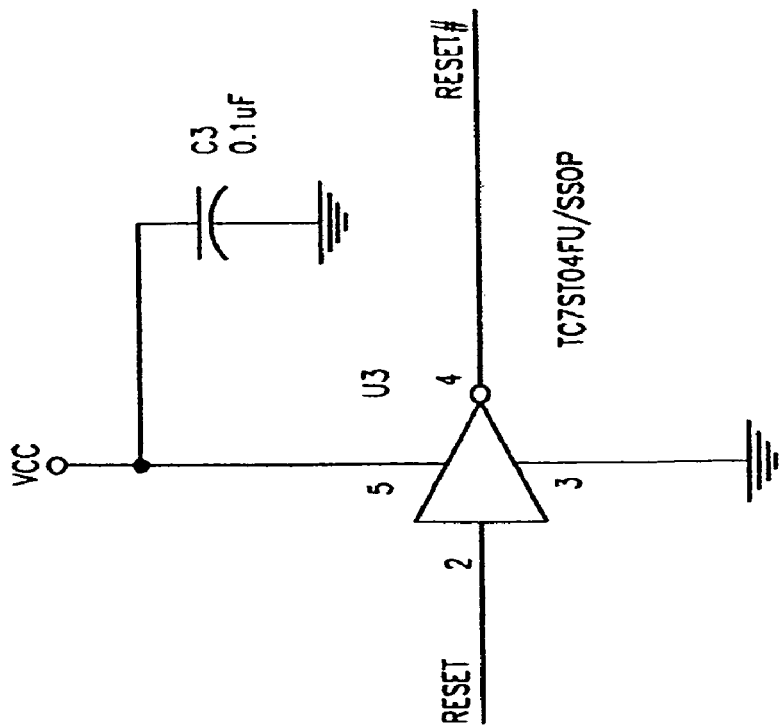
Figure 3E:
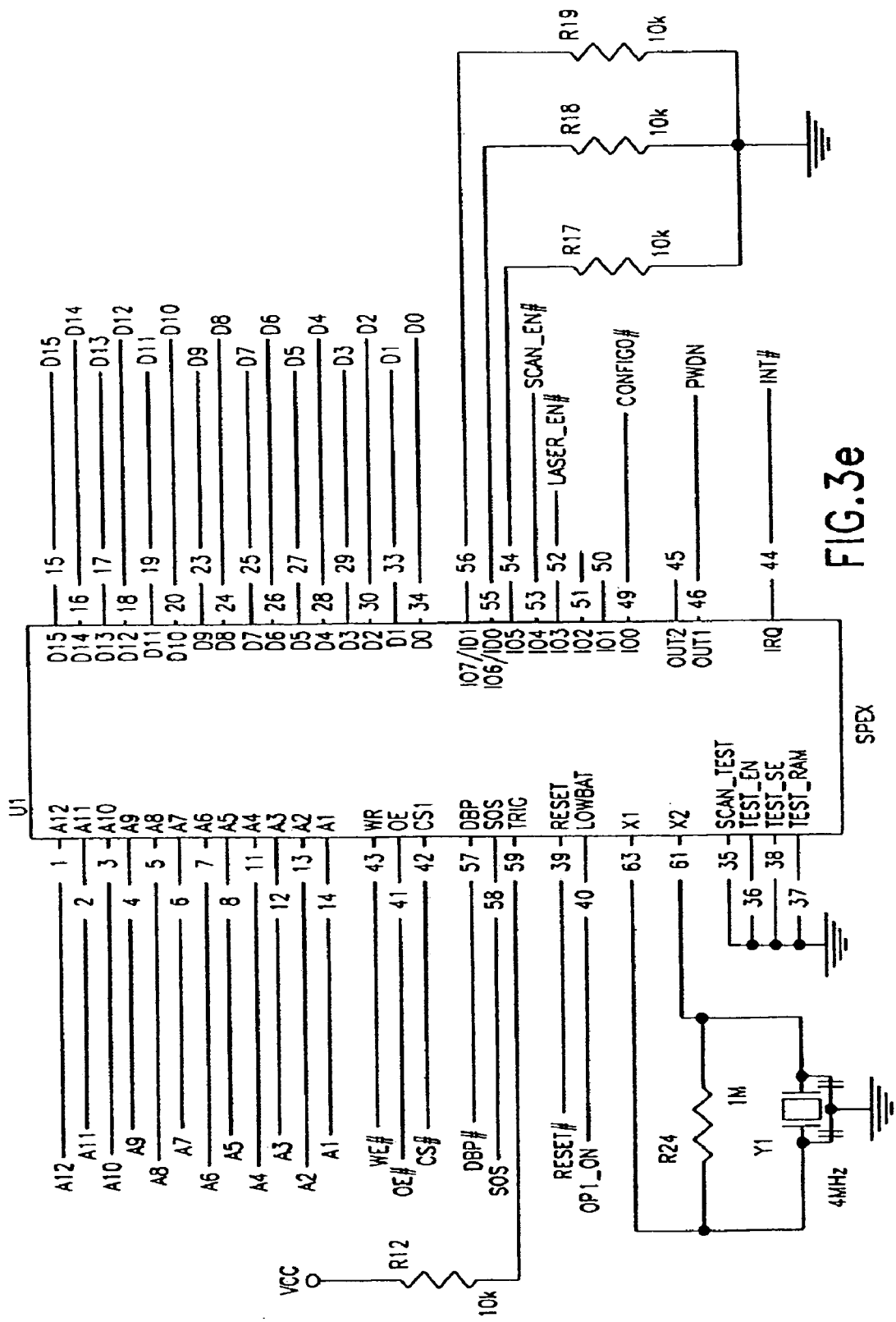
FIG. 3e shows a scanner controller that controls the scanner of the adapter interface board.
Figure 3F:
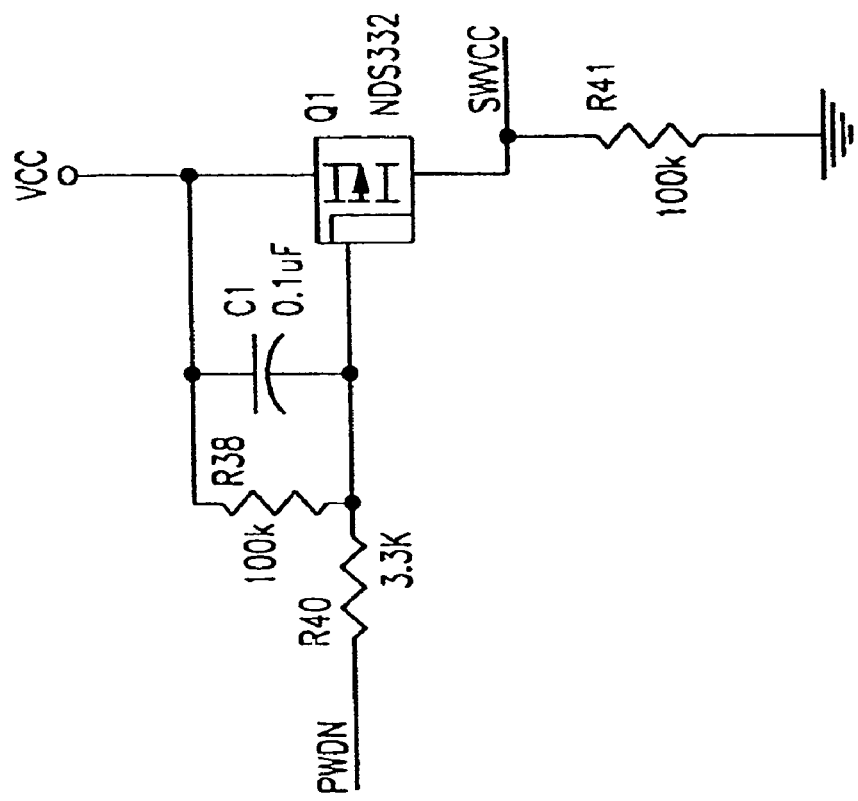
FIG. 3f shows power-down switching transistor and interface connector for the adapter interface board.
Figure 3F:
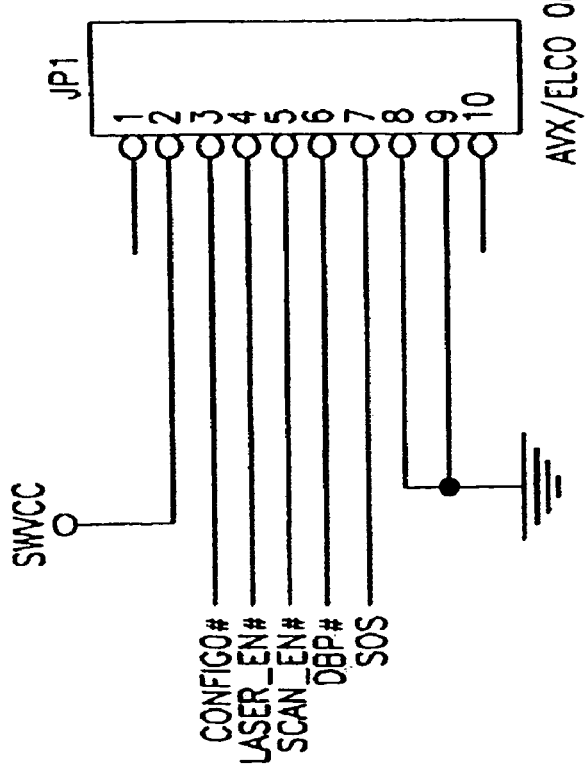

FIG. 3 is an electrical schematic of the interface board of the adapter of the present invention. The interface board includes circuitry for communicating with a bar code scanner via connector JP1. Alternatively, the interface board could include circuitry for an imager such as a charged coupled device (CCD) or similar technology known to those of skill in the art.

Figure 4A:
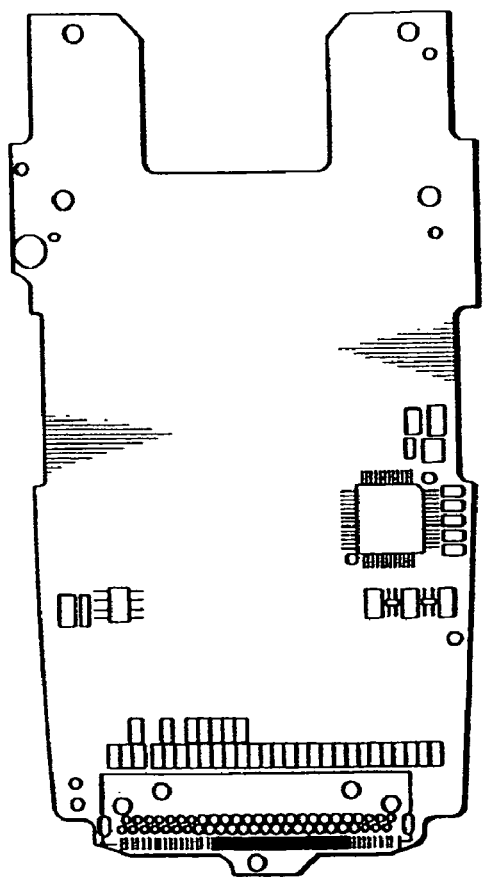
FIG. 4a is a drawing of a primary side view of a circuit board of an embodiment of the adapter of the present invention.
Figure 4B:
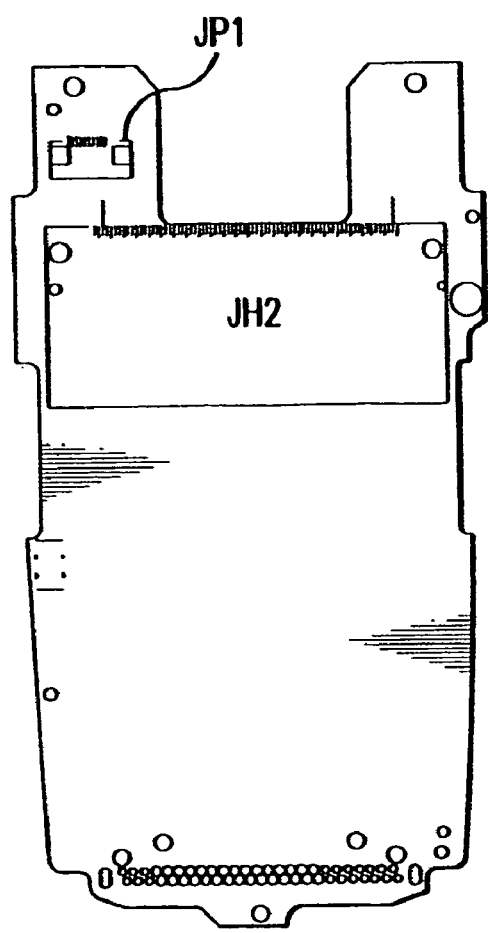
FIG. 4b is a drawing of a secondary side view of a circuit board of an embodiment of the adapter of the present invention.

FIGS. 4a and 4b show the primary and secondary sides, respectively, of a printed circuit board of the adapter according to the present invention. Connector JP1 interfaces electronics on the circuit board with a scanner module. An external connector JH1 interfaces electronics on the circuit board with the iPAQ PDA. A 68-pin connector JH2 interfaces electronics on the circuit board with a PC card having radio or other functionality. Thus, the adapter integrates both the scanner module and the radio module, together with an antenna, inside it. Some of the electronic components between the two modules can be shared.

In another alternative embodiment, the modules are not integrated inside the adapter, but are selectively plugged into the adapter. For this, either the JP1 or JH2, must also be an external connector. For example, if the adapter has a PCMCIA compatible connector, any PCMCIA compatible module can be plugged into the adapter, thus expanding system flexibility even further. Module compatible interface connectors, other than the PCMCIA interface connectors are envisioned to be within the scope of the present invention. As can be gathered from the above description, while the adapter must have a PDA compatible connector for interfacing to the PDA, the expansion module connector is optional.

FIGS. 8–13 are drawings of an alternative embodiment of the present invention. The adapter 200 includes a cover 204 and a carrier 206. The carrier 206 includes a bottom wall 208 and two sidewalls 210 extending from bottom wall 208. Curved portions 211 of sidewalls 210 of carrier 206 are curved in such a way that they partially cover the sides of the PDA. Curved portions 211 protect the PDA from side-to-side movement and side impact. Curved portions 211 also prevent adapter 200 from being pulled off the PDA and protect the PDA from front impact. An interface circuit 227 board and a scanner, a radio, RFID tag reader, global positioning system, telephone, or some other module, is housed between the cover 204 and the bottom wall 208 of the adapter. The adapter of FIG. 8a shows an adapter having an integrated scanner located behind the scanning window 220.

Sidewalls 210 include a gripping surface 213 for improved ergonomics. As electronic components are added to the adapter, the overall thickness of adapter may increase. Users with small hands may have difficulty wrapping their fingers all the way around to the curved portion of the sidewalls. Gripping surface 213 provides a surface for these users to place their fingertips allowing them to grasp the adapter in a secure manner. Users with larger hands may choose to place their fingertips either on the side of the PDA or on gripping surface 213. When viewing the adapter from a horizontal position, the gripping surface 213 has a portion that is below bottom wall 208 and a portion that is above bottom wall 208.

Figure 13:
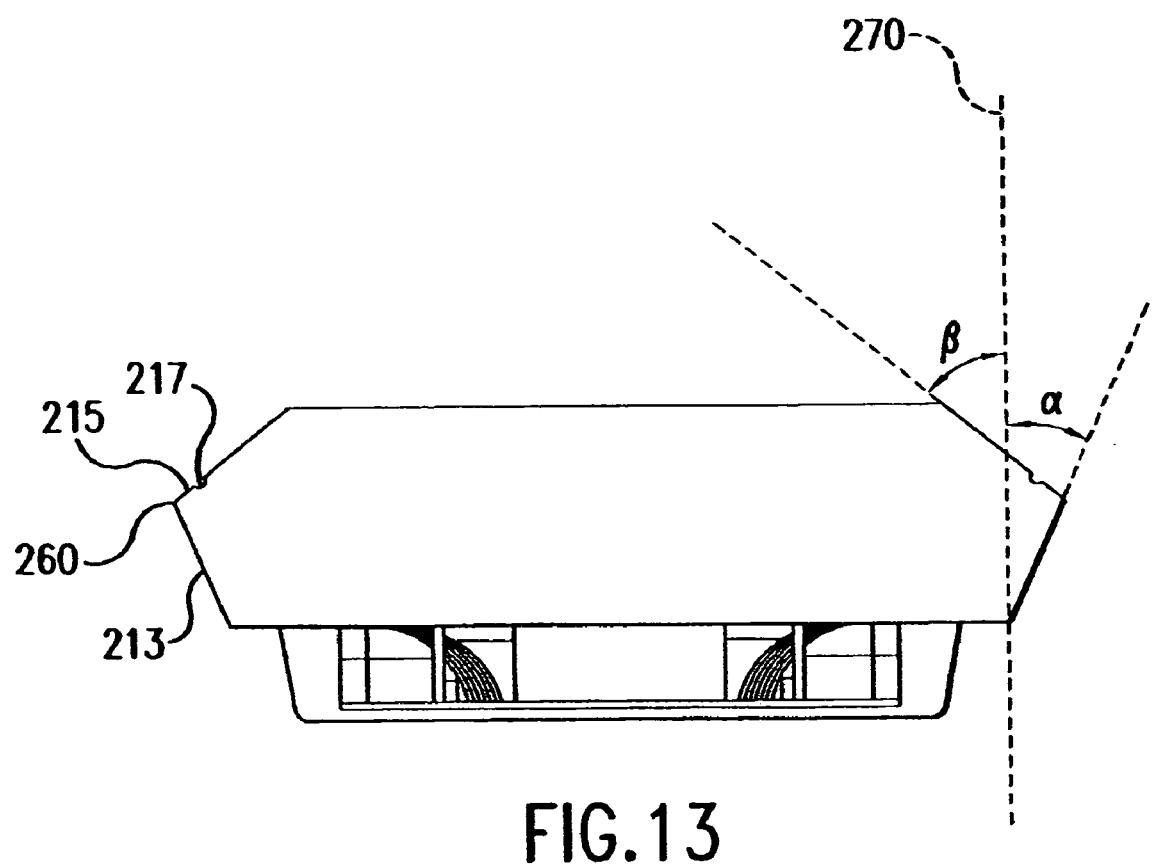
FIG. 13 is a view taken along line A—A of FIG. 12.

As illustrated in FIG. 13, gripping surface 213 has a portion that radiates in an outward direction relative to a vertical axis 270. An angle $\alpha$ is formed along vertical axis 270 and the gripping surface 213. Angle $\alpha$ may change depending on where along gripping surface 213 it is measured. An angle $\beta$ is formed along vertical axis 270 and a side section 215 above the gripping surface 213. Side section 215 consists of portions of carrier 206 and cover 204 (not shown in FIG. 13). FIG. 13 shows a seam 217 where carrier 206 meets cover 204. Alternatively, the side section could consist of portions of only the carrier or only the cover. Gripping surface 213 and side section 215 meet to form a ridge 260. Ridge 260 improves the ergonomics of adapter 200 and helps prevent a user's fingers from slipping off gripping surface 213.

Figure 10:
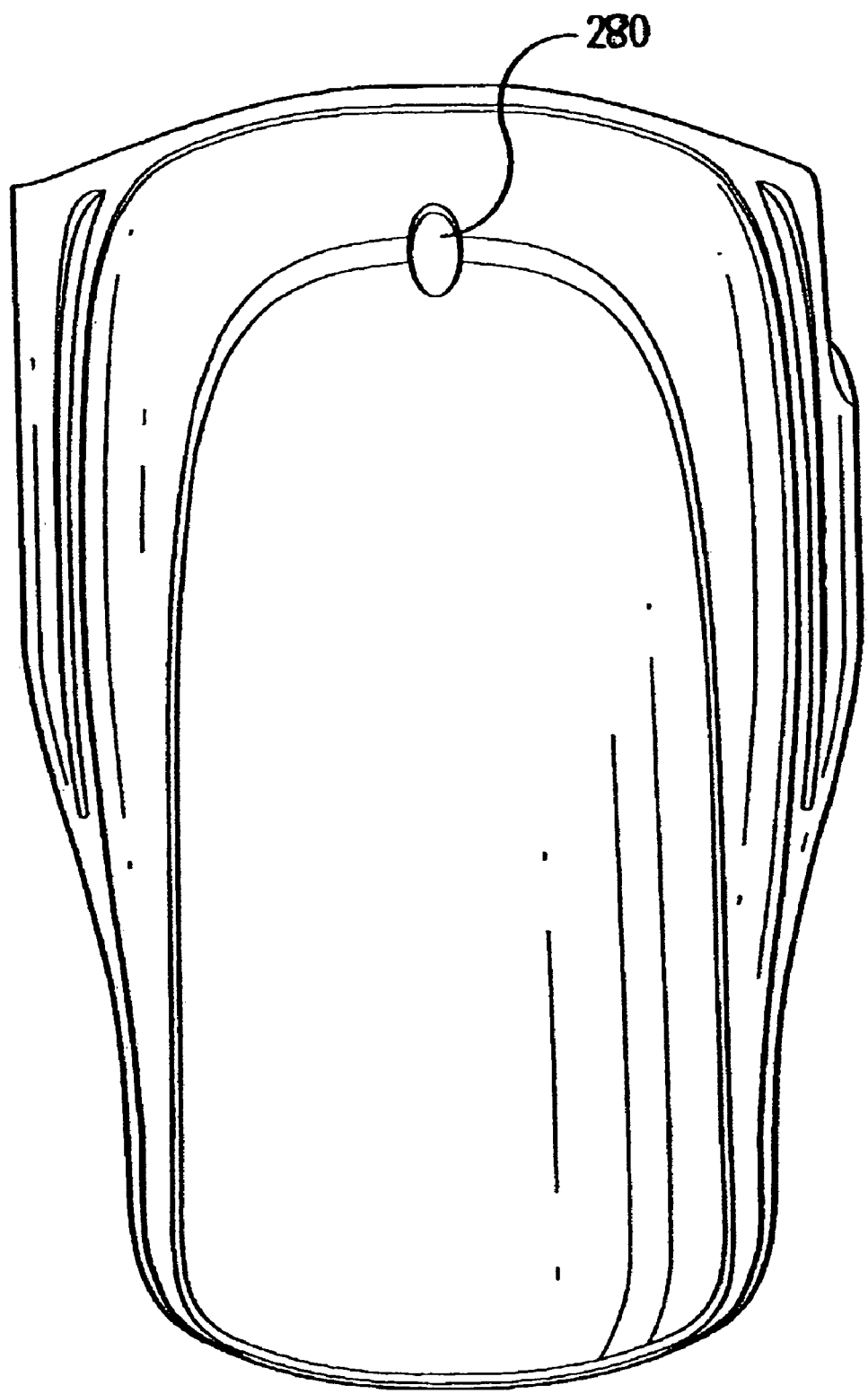
FIG. 10 shows a top view of the embodiment of the present invention shown in FIGS. 8a and 8b.
Figure 11:
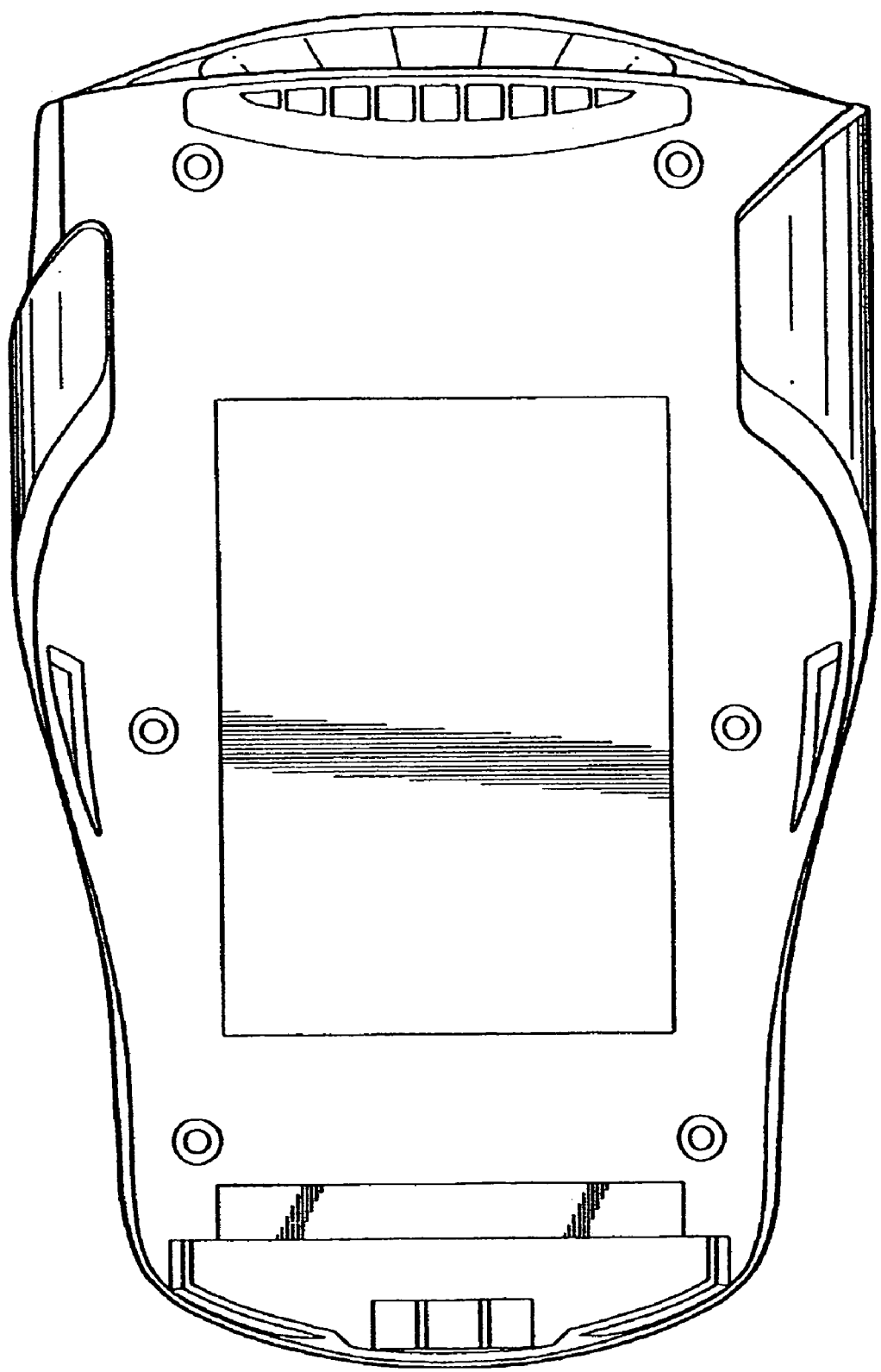
FIG. 11 shows a bottom view of the embodiment of the present invention shown in FIGS. 8a and 8b.
Figure 12:
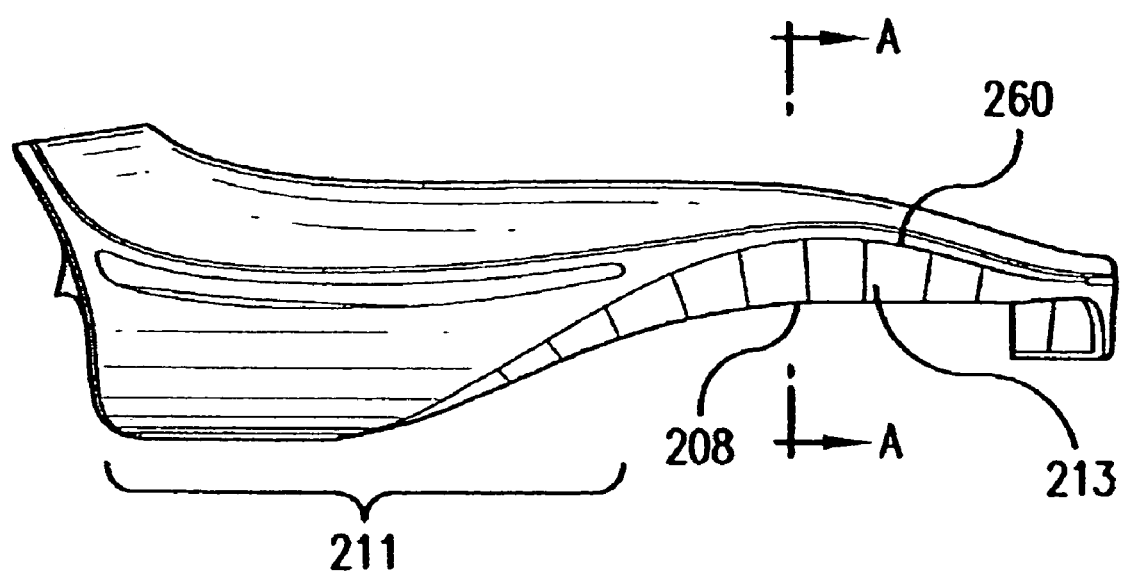
FIG. 12 shows a side view of the embodiment of the present invention shown in FIGS. 8a and 8b.

FIG. 10 shows a notch 280 where a tether or strap (not shown) can be attached to adapter 200. The tether allows the operator to carry the device without worrying about dropping it. The tether is preferably attached to the top of adapter 200 so if adapter 200 hangs from the tether the PDA would be in an upright position and less likely to slip out of the adapter.

Adapter 200 shown in the embodiment of FIGS. 8–13 does not have a retainer clip. In an alternative embodiment adapter 200 could include a retainer clip to lock the adapter and the PDA together as shown in the embodiments of FIGS. 1*a*, 1*b*, 1*e*, 1*f* and 1*g*. When adapter 200 is connected to the PDA, curved portions 211 restrict the side-to-side movements of the PDA with respect to adapter 200. Adapter connector 224 restricts movement of the PDA along the length of adapter 200.

A connector interface 205 is flexibly secured to adapter 200. Connector interface 205 may be secured by a spring or similar arrangement to allow it to move in an orthogonal direction relative to the bottom wall 208. The connector interface 205 has ribbed members 205*a* that engage with a receiving receptacle on the PDA (not shown). When the PDA is inserted into adapter 200, connector interface 205 is forced down until the PDA's receiving receptacle engages ribbed members 205*a*. At this moment ribbed members 205*a* spring up into the PDA's receiving receptacle creating an audible click. The audible click notifies the user that adapter 200 is fully secured to the PDA.

Figure 5:
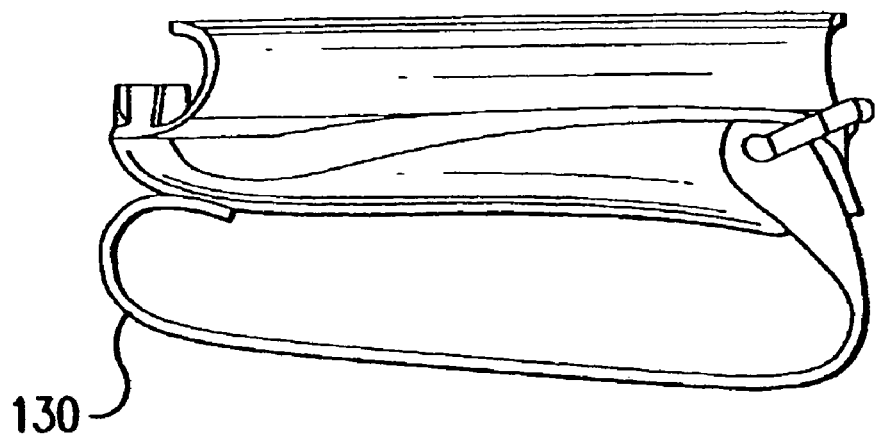
FIG. 5 illustrates an adapter and a hand strap according to the invention.

FIG. 5 illustrates an adapter having a hand strap 130. Hand strap 130 is attached to the top of the adapter and allows the operator to carry the device without worrying about dropping it. The adapter, which is typically made out of plastic material, can have a rubber over-mold with a finger grip designed into it.

Figure 6:
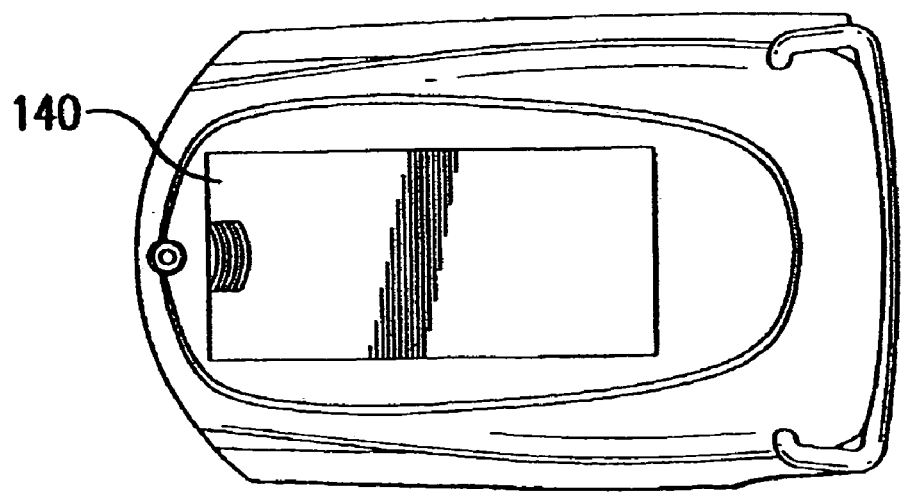
FIG. 6 shows compartment for a rechargeable battery located inside the adapter.

FIG. 6 shows compartment for a rechargeable, or a disposable, battery located inside the adapter. The battery is accessed via a battery door 140 that forms a part of the adapter's top cover.

Figure 7:
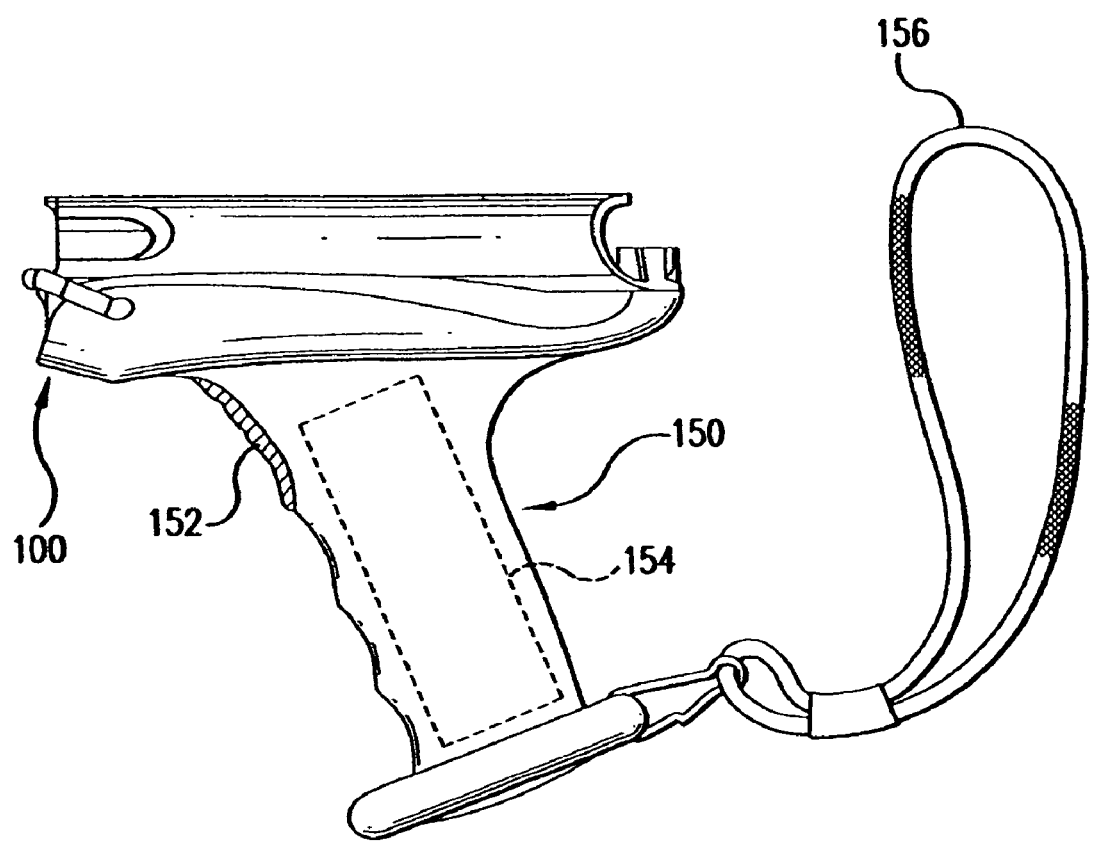
FIG. 7 shows an adapter with a handle grip.
Figure 8A:
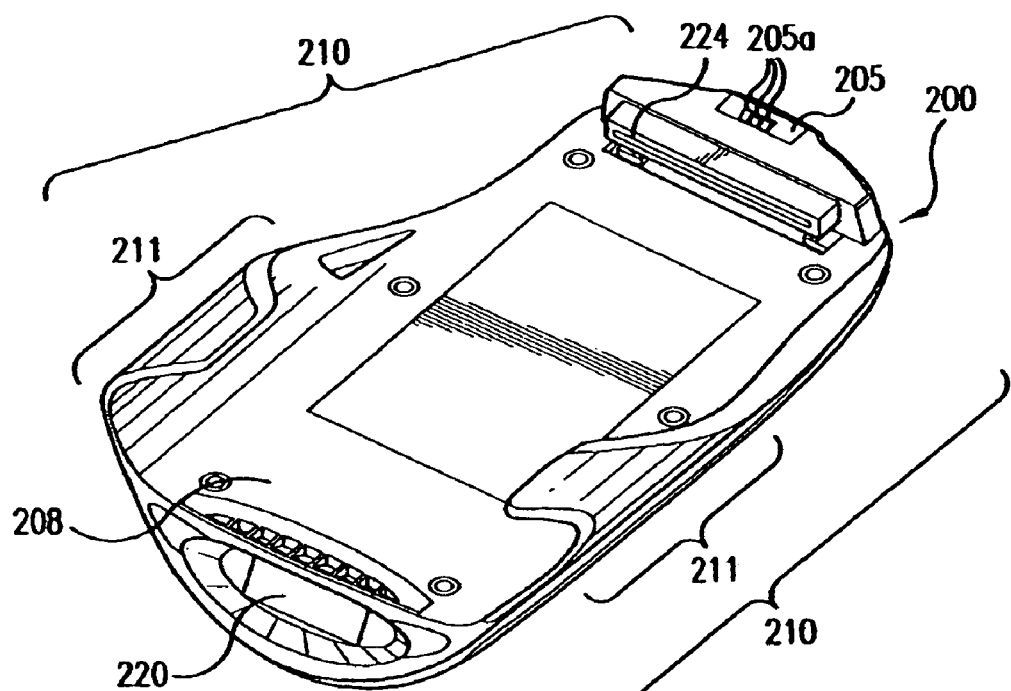
FIGS. 8a and 8b show a bottom perspective view of another embodiment of the present invention.
Figure 8B:
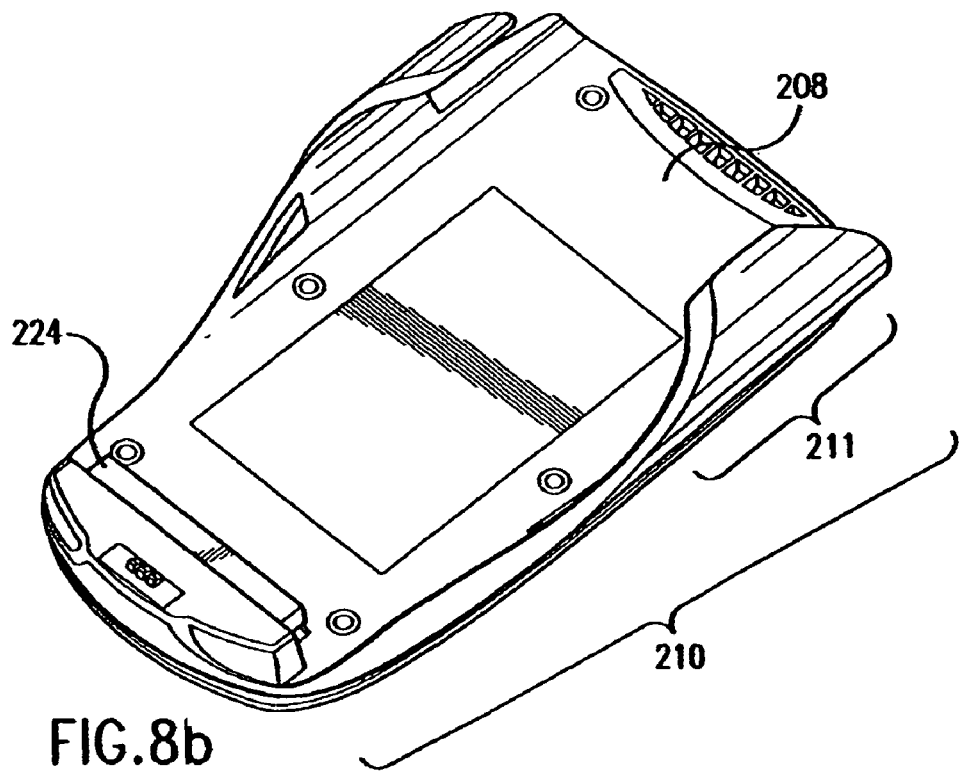
Figure 9:
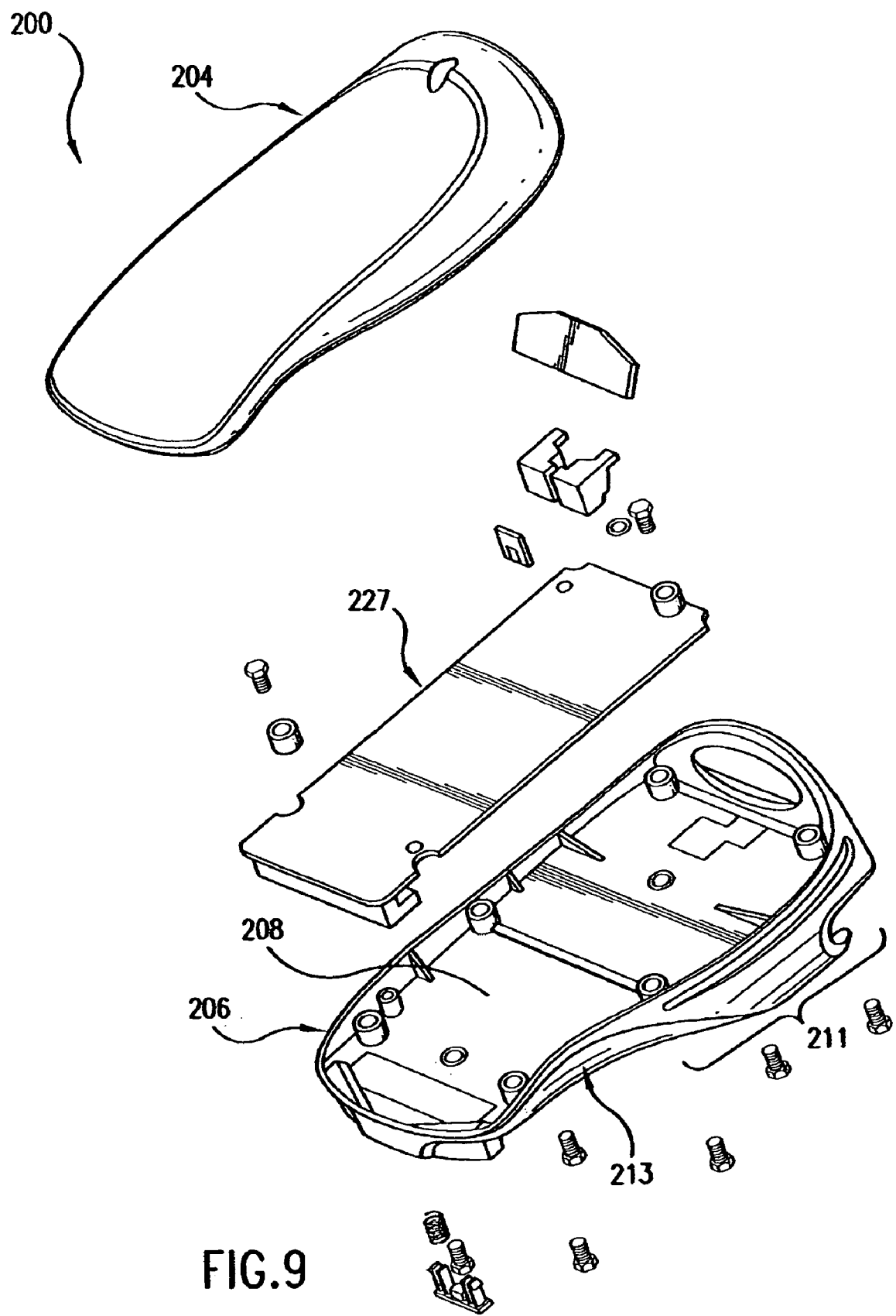
FIG. 9 shows an exploded perspective view of the embodiment of the present invention shown in FIGS. 8a and 8b.

FIG. 7 shows an adapter having a handle grip 150 extending from the surface of the adapter. Handle grip 150 may be detachable from the adapter. In addition, handle grip 150 includes a trigger mechanism 152 for triggering ("energizing") the module that is integrated inside the adapter. Handle grip 150 has a battery compartment 154 inside it, such that the device can be operated for longer periods of time. As an alternative, the adapter may not have any batteries inside, and would receive its power from handle grip 150. Handle grip 150 also includes a wrist tether 156 allowing the operator to carry the device without having to grip it.

Changing Functionality of Application Buttons

In one embodiment of the present invention a user can change the functionality of one or more of the application buttons on the PDA in a manner that is seamless to the user. For example, one of the buttons on the PDA may be dedicated to functioning as an audio recording button. When a user attaches an adapter that has scanning capability, the user may want to use that button to trigger a scanning operation instead of audio recording. According to a preferred embodiment, by attaching the adapter to the PDA, the functionality of the button may be reconfigured to a scanning function without any additional steps by the user.

Figure 14:
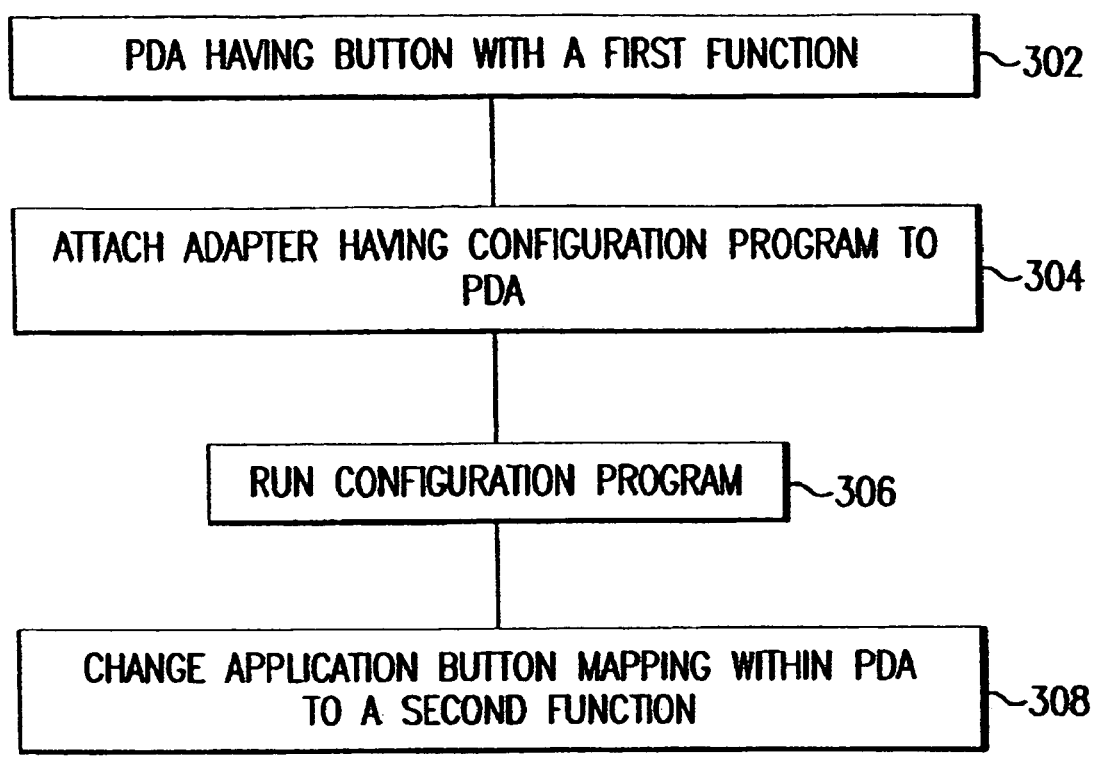
FIG. 14 shows a flowchart representing a configuration routine for a preferred embodiment of the present invention wherein an adapter is attached to the PDA.

FIG. 14 shows a flowchart representing a configuration routine for a preferred embodiment of the present invention. Step 302 represents a PDA having an application button that is assigned a certain function. In this preferred embodiment the adapter includes nonvolatile memory that includes a configuration program. The configuration program may include a program that includes routines for changing the functionality of one or more of the application buttons on the PDA. The configuration program changes application button mappings within the PDA to produce the desired functionality. When a device (such as an adapter) is attached to the PDA (and when the PDA is turned on) at 304, the PDA will run the configuration program at 306. At step 308, the configuration program will change the application button mapping in the PDA to change the functionality of one or more of the application buttons from an original function to a reconfigured function. Thus, the change of function of the buttons is seamless to the user. The reconfigured function of the button will preferably be related to a function that was added by the attachment of the adapter to the PDA.

Figure 15:
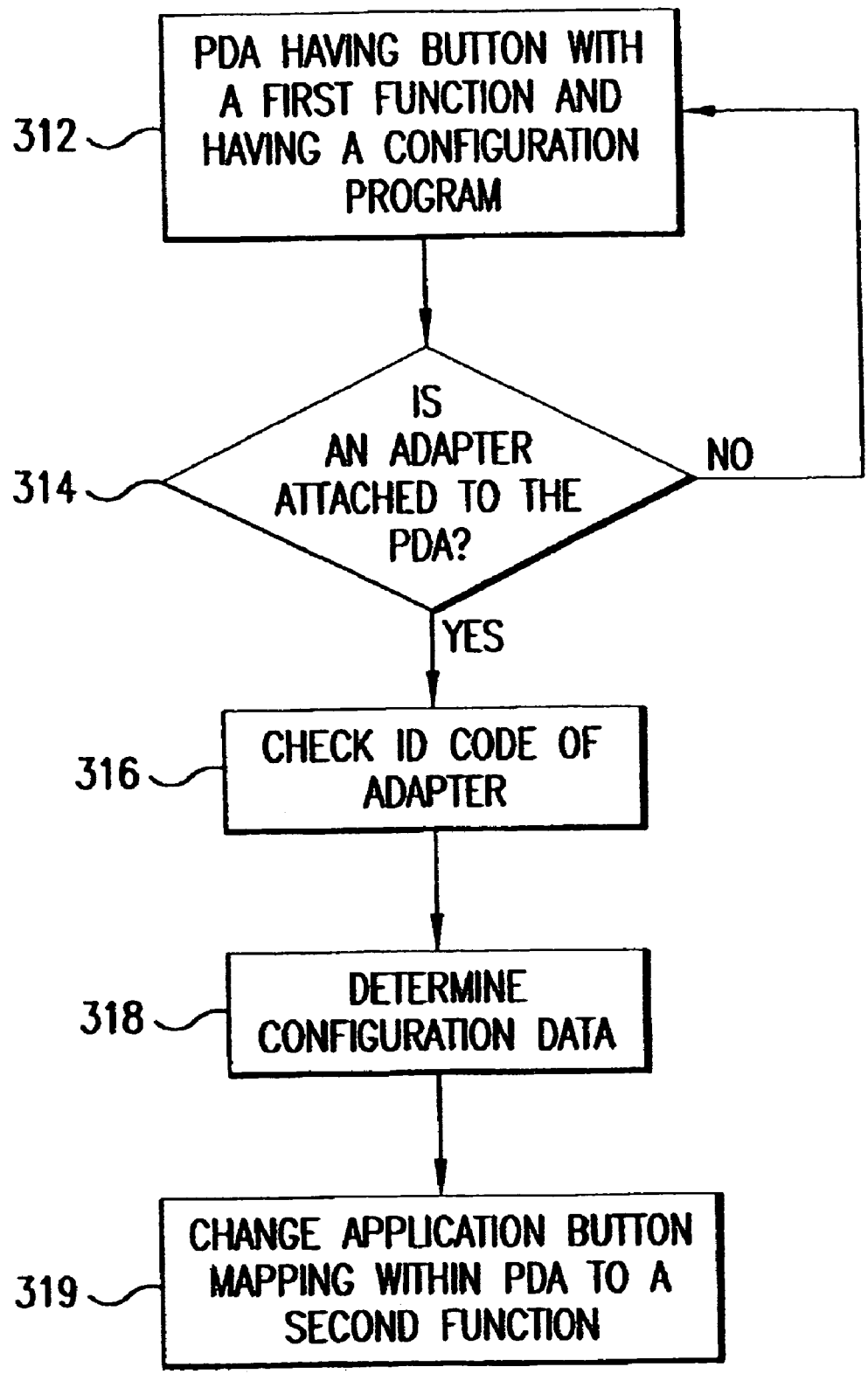
FIG. 15 shows a flowchart representing a configuration routine for another preferred embodiment of the present invention wherein an adapter is attached to the PDA.

FIG. 15 shows a flowchart representing a configuration routine for another preferred embodiment of the present invention. Step 312 represents the PDA having an application button with a certain function wherein the PDA has a configuration program stored in a memory. Alternatively, the configuration program could reside on a remote site that is accessible by the PDA. At step 314, the PDA could poll its expansion connector to detect the presence of any attached devices. An attachable device (such as an adapter) may have associated with it an identification code. The identification code may include a portion that identifies a manufacturer and a portion that identifies a device. If the device is attached to the PDA, the PDA will check the identification code of the attached device at 316. Once the PDA determines the identification code of the attached device, at 318 the PDA accesses configuration data that provides information for the PDA to change the functionality of the application buttons. The configuration data may be determined by accessing a look up table (stored either locally on the PDA or remotely). Alternatively, instead of having an identification code associated with the attached device, the device may store the reconfiguration data in the device's nonvolatile memory. At 319, the configuration program may change the application button mapping in the PDA in order to change the functionality of one or more of the application buttons from an original function to a reconfigured function. Thus, the change of function of the buttons is seamless to the user. Again, the reconfigured function of the button will preferably be related to a function that was added by the attachment of the device to the PDA.

Figure 16:
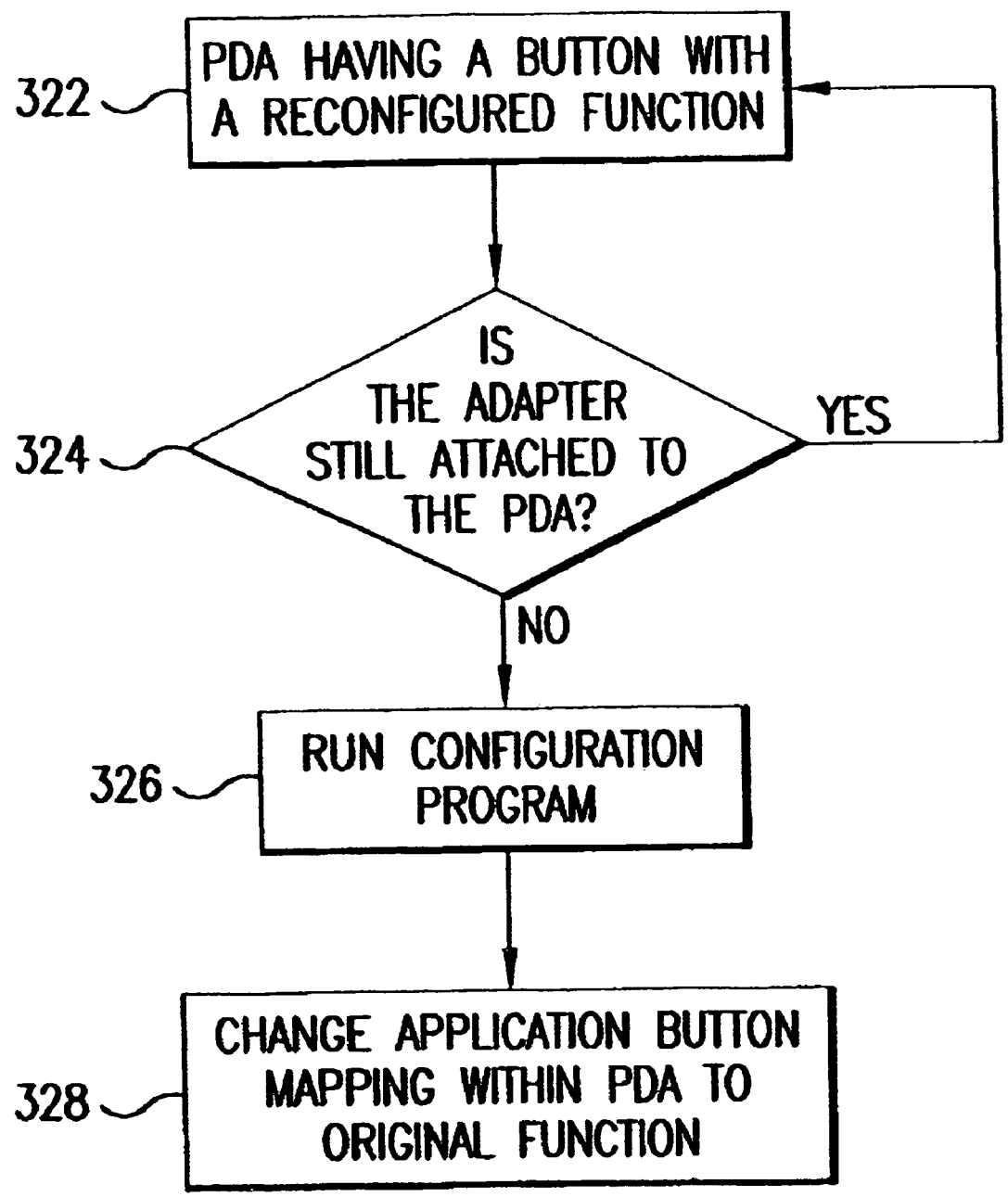
FIG. 16 shows a flowchart representing a configuration routine for a preferred embodiment wherein an adapter is removed from the PDA.

FIG. 16 shows a flowchart representing a configuration routine for a preferred embodiment wherein the adapter is removed from the PDA. Step 322 represents the PDA having an application button with a certain reconfigured function. In this preferred embodiment of the invention, the reconfigured function of the application button will revert back to the original function when the adapter is removed. The PDA may include a routine for polling the PDA's expansion connector to determine whether any devices are attached. At step 324 the PDA polls the expansion connector. If the polling routine determines that an adapter is no longer connected to the PDA, the configuration program may be activated at 326. At step 328 the configuration program may change the application button mapping in the PDA in order to change the functionality of the application buttons from the reconfigured function back to the original function. Thus, when a user no longer needs to use the additional functions provided by the adapter unit, he does not have to input any data into the PDA to revert back to the original function of the application buttons. The user can simply detach the adapter from the PDA, and the PDA could automatically reconfigure the application buttons.

Memory Feature

In another preferred embodiment of the invention, the adapter may include a memory backup system. The memory backup system helps prevent the PDA from losing information stored in the PDA's volatile memory in the event that the PDA's battery source is critically low. PDA's typically include a battery monitoring circuit that monitors the PDA's battery source to determine an energy level. If the energy level falls below a certain shut down value, the PDA automatically shuts down. The manufacturer or programmer of the PDA sets the shut down value to be large enough so that some power is reserved to maintain the contents of the PDA's volatile memory. However, this system does not guarantee that the contents of the PDA's volatile memory will be preserved. The energy level may continue to decrease over time until the data stored in the volatile memory becomes irretrievable.

Figure 17:
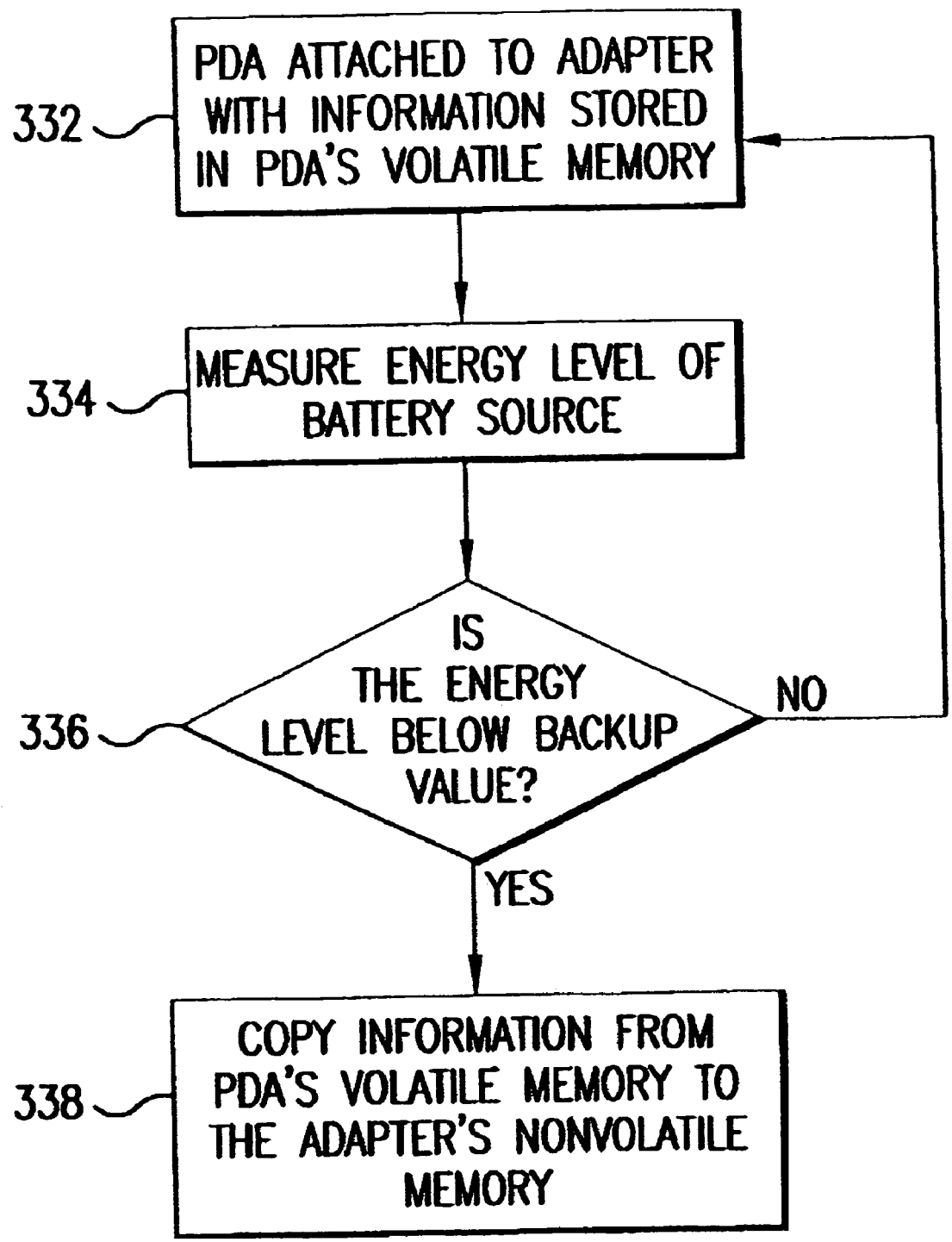
FIG. 17 shows a flowchart representing a memory backup system for a preferred embodiment of the present invention.

FIG. 17 shows a flowchart representing a memory backup system for a preferred embodiment of the present invention. Step 332 represents a PDA having a volatile memory attached to an adapter. The adapter has a nonvolatile memory capable of storing data and application programs. The system measures the energy level of the battery source at 334 and compares the energy level to a certain backup value at 336. If the energy level of the battery source falls below the backup value, at step 338 the data stored in the PDA's volatile memory is copied in the adapter's nonvolatile memory or to a remote storage area. The remote storage area may include a facility linked to a wide area network or a local area network. The backup value may be set to be equal to or different than the shut down value. If the data stored in the PDA's volatile memory is irretrievable because the energy level of the battery source is too low to maintain the memory, the data may be reconstructed by using the data stored in the adapter's nonvolatile memory.

What is claimed is:

1. An adapter unit that communicates with a personal digital assistant (PDA), comprising:
   a carrier portion that includes two sidewalls and a bottom wall that conform to a surface of the PDA, at least a portion of each of the two sidewalls are curved to partially encompass at least a portion of a display-side surface of the PDA; and
   a product identification reader that is encased in the carrier portion and reads a product identification code.

2. The adapter unit of claim 1, further comprising an expansion connector that facilitates a communication link between the carrier portion and the PDA.

3. The adapter unit of claim 2, the expansion connector facilitates the communication link between the PDA and the product identification reader.

4. The adapter unit of claim 1, the carrier portion further comprising at least one of a radio, a CCD imager, an RFID tag reader, a global positioning system technology, and a telephone.

5. The adapter unit of claim 1, the product identification reader is included between a cover and a bottom wall of the carrier portion.

6. The adapter unit of claim 1, at least one of the sidewalls is curved to conform to the PDA.

7. The adapter unit of claim 1, the sidewalls only partially cover respective surfaces of the PDA.

8. The adapter unit of claim 1, further comprising circuitry that facilitates wireless communications.

9. The adapter unit of claim 1, further comprising a gripping surface that extends above a top section of a bottom wall of the carrier portion.

10. The adapter unit of claim 9, the gripping surface comprises more than 20% of the length of the PDA.

11. An adapter unit that communicates with a PDA, comprising:
    a carrier portion that includes two sidewalls, and conforms to at least a portion of a front surface of the PDA, the two sidewalls are overlapped by a wall portion of the adapter unit;
    an expansion connector that facilitates a communication link between the carrier portion and the PDA; and
    a product identification reader that reads a product identification code, and is encased in the carrier portion between a cover and a bottom wall of the carrier portion.

12. The adapter unit of claim 11, further comprising a battery door that facilitates access to a battery.

13. The adapter unit of claim 11, further comprising an interface for a PCMCIA compatible module.

14. The adapter unit of claim 11 interfaces to the PDA via at least four surfaces of the PDA.

15. The adapter unit of claim 11, further comprising a detachable handle grip that extends from a surface of the adapter, the handle grip includes a triggering mechanism that triggers the adapter.

16. The adapter unit of claim 11, the handle grip includes a power source that provides power to the adapter.

17. An adapter unit that couples to a PDA, comprising:
    carrier means that includes two sidewalls and a bottom wall that interface to corresponding surfaces of the PDA, at least a portion of each of the two sidewalls are curved to encompass at least a portion of the PDA;
    means for scanning a product dataform with a scanning means, the scanning means housed in the carrier means;
    means for processing signals associated with the scanning means; and
    an expansion connector that facilitates communications between the carrier means and the PDA.

18. The adapter unit of claim 17, further comprising at least one of a radio, a CCD imager, an RFID tag reader, global positioning system, and a telephone.

19. The adapter unit of claim 17, further comprising a power source that provides power to the scanning means.

* * * * *

UNITED STATES PATENT AND TRADEMARK OFFICE
CERTIFICATE OF CORRECTION

PATENT NO. : 7,147,163 B2 Page 1 of 1
APPLICATION NO. : 10/790367
DATED : December 12, 2006
INVENTOR(S) : Dominick H. Salvato et al.

It is certified that error appears in the above-identified patent and that said Letters Patent is hereby corrected as shown below:

On Title Page
Item 63
Related U.S. Application Data:

Please replace:

"Continuation of application No. 09/912,162, filed on Jul. 24, 2001, now abandoned."

with

--Continuation of application No. 09/912,162, filed on Jul. 24, 2001, now U.S. Patent No. 6,820,813.--

Signed and Sealed this

Eighteenth Day of September, 2007

JON W. DUDAS
*Director of the United States Patent and Trademark Office*